(12) United States Patent
Kleijn et al.

(10) Patent No.: US 11,417,351 B2
(45) Date of Patent: Aug. 16, 2022

(54) MULTI-CHANNEL ECHO CANCELLATION WITH SCENARIO MEMORY

(71) Applicant: GOOGLE LLC, Mountain View, CA (US)

(72) Inventors: Willem Bastiaan Kleijn, Eastborne Wellington (NZ); Turaj Zakizadeh Shabestary, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1074 days.

(21) Appl. No.: 16/019,402

(22) Filed: Jun. 26, 2018

(65) Prior Publication Data

US 2019/0392853 A1    Dec. 26, 2019

(51) Int. Cl.
*G10L 21/0208* (2013.01)
*H04M 9/08* (2006.01)
*G06F 3/16* (2006.01)
*G10L 21/0216* (2013.01)

(52) U.S. Cl.
CPC .......... *G10L 21/0208* (2013.01); *G06F 3/167* (2013.01); *H04M 9/082* (2013.01); *G10L 2021/02082* (2013.01); *G10L 2021/02163* (2013.01)

(58) Field of Classification Search
CPC ....... G10L 21/0208; G10L 2021/02163; G10L 2021/02082; H04M 9/082; G06F 3/167
See application file for complete search history.

(56) References Cited

U.S. PATENT DOCUMENTS

| 5,323,459 | A | 6/1994 | Hirano | |
| 5,796,819 | A * | 8/1998 | Romesburg | H04B 7/015 |
| | | | | 379/406.09 |
| 6,246,760 | B1 | 6/2001 | Makino et al. | |
| 6,556,682 | B1 | 4/2003 | Gilloire et al. | |
| 6,700,977 | B2 | 3/2004 | Sugiyama | |
| 8,284,949 | B2 | 10/2012 | Farhang et al. | |
| 8,605,890 | B2 | 12/2013 | Zhang et al. | |
| 8,712,068 | B2 | 4/2014 | Christoph | |
| 9,554,210 | B1 | 1/2017 | Ayrapetian et al. | |
| 9,633,651 | B2 * | 4/2017 | Habets | G10L 25/78 |

(Continued)

*Primary Examiner* — Lisa Hashem
(74) *Attorney, Agent, or Firm* — Brake Hughes Bellermann LLP

(57) ABSTRACT

According to an aspect, a method for multi-channel echo cancellation includes receiving a microphone signal and a multi-channel loudspeaker driving signal. The multi-channel loudspeaker driving signal includes a first driving signal that drives a first loudspeaker, and a second driving signal that drives a second loudspeaker. The first driving signal is substantially the same as second driving signal. The microphone signal includes a near-end signal with echo. The method includes determining a unique solution for acoustic transfer functions for a present acoustic scenario based on the microphone signal and the multi-channel loudspeaker driving signal. The acoustic transfer functions include first and second acoustic transfer function. The unique solution is determined based on time-frequency transforms of observations from the present acoustic scenario and at least one previous acoustic scenario. The method includes removing the echo from the microphone signal based on the first and second acoustic transfer function.

17 Claims, 7 Drawing Sheets

(56) References Cited

U.S. PATENT DOCUMENTS

| | | | |
|---|---|---|---|
| 2002/0176584 A1* | 11/2002 | Kates | H04R 25/453 |
| | | | 381/60 |
| 2002/0198690 A1* | 12/2002 | Holzrichter | G10L 15/24 |
| | | | 703/2 |
| 2003/0149553 A1* | 8/2003 | Holzrichter | G10L 15/24 |
| | | | 703/2 |
| 2006/0002547 A1 | 1/2006 | Stokes et al. | |
| 2010/0135483 A1* | 6/2010 | Mohammad | H04M 9/082 |
| | | | 379/406.08 |
| 2014/0056435 A1* | 2/2014 | Kjems | H04M 9/082 |
| | | | 381/66 |
| 2015/0381821 A1* | 12/2015 | Kechichian | H04M 3/002 |
| | | | 381/93 |
| 2016/0127535 A1* | 5/2016 | Theverapperuma | H04M 9/082 |
| | | | 455/570 |
| 2016/0171964 A1* | 6/2016 | Kim | G10L 21/02 |
| | | | 381/71.11 |
| 2016/0322045 A1* | 11/2016 | Hatfield | G10L 25/84 |
| 2017/0127206 A1* | 5/2017 | Skovenborg | G01H 7/00 |
| 2019/0028824 A1* | 1/2019 | Freeman | H03G 5/165 |
| 2020/0359154 A1* | 11/2020 | Brown | H04S 7/301 |
| 2020/0374617 A1* | 11/2020 | Liu | H04R 1/1016 |
| 2021/0193103 A1* | 6/2021 | Zollner | G10K 11/17833 |
| 2021/0274296 A1* | 9/2021 | Rohde | H04R 25/604 |
| 2021/0306744 A1* | 9/2021 | Mehra | H04R 5/027 |
| 2021/0314721 A1* | 10/2021 | Noh | H04R 3/04 |
| 2021/0360363 A1* | 11/2021 | Roussel | H04R 3/005 |

* cited by examiner

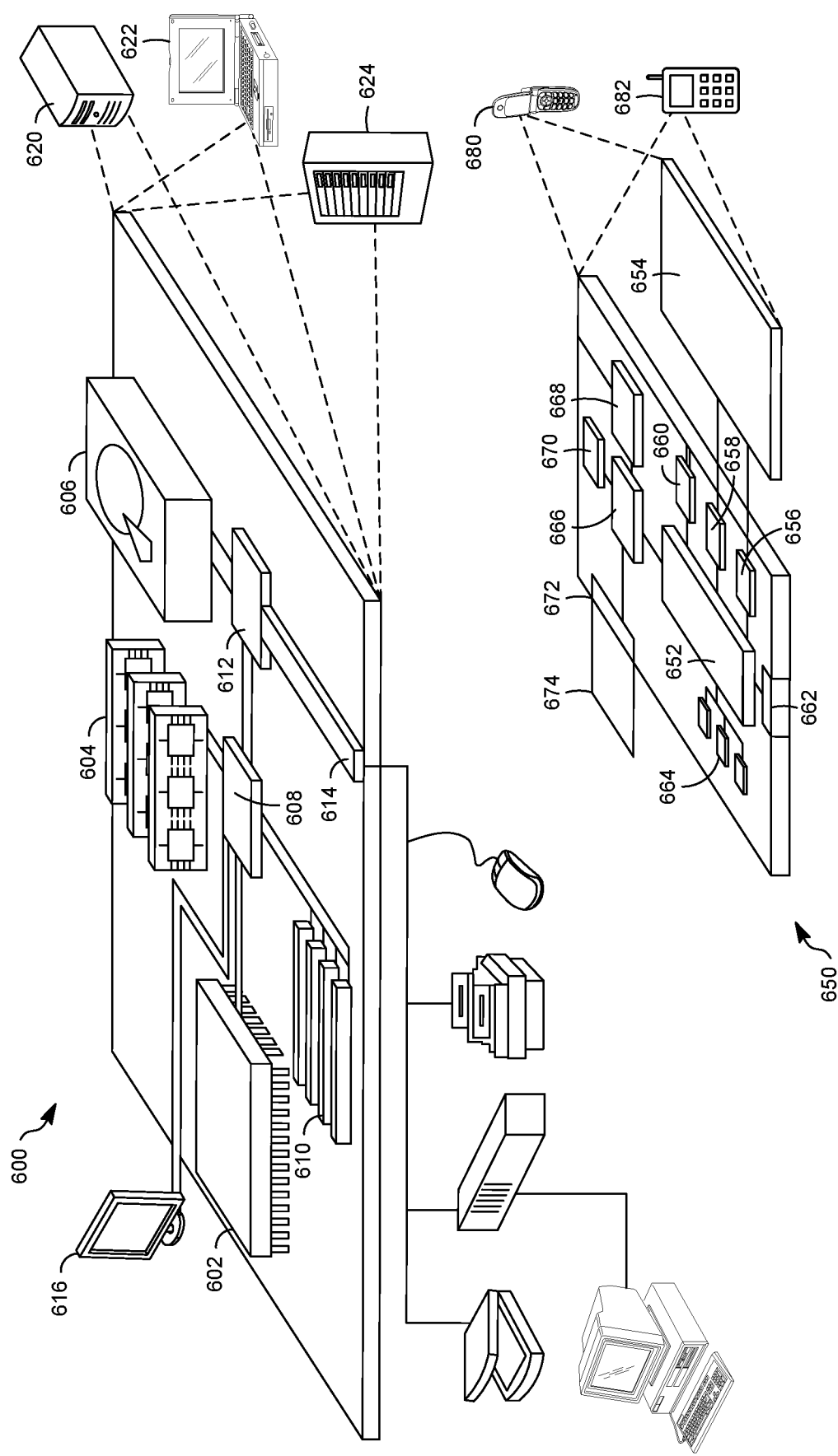

MULTI-CHANNEL ECHO CANCELLATION WITH SCENARIO MEMORY

TECHNICAL FIELD

This description relates to echo cancellation for a multi-channel audio signal having two or more audio signals that are not independent.

BACKGROUND

The extension of single-channel echo cancellation to multi-channel echo cancellation may not be straightforward. In a multi-channel case, an audio system may include multiple loudspeakers and one or more microphones. A person may be speaking, and the microphone may pick up a microphone signal. Echo cancellation may remove, from the microphone signal, the signal components that are correlated to the signals driving the two or more loudspeakers. Echo cancellation may be relatively straightforward if the loudspeakers all transmit or produce different signals (e.g., statistically independent signals).

However, in some examples, the loudspeakers do not produce independent signals, which can make echo cancellation relatively difficult. For example, in an audio system that plays out a mono signal, there is only one signal being transmitted out of both loudspeakers. In this situation, since the loudspeaker signals are not independent, the audio system is not able to uniquely determine the transfer functions between the microphone and the loudspeakers. Even when the transfer functions are not unique, a problem may not occur if the acoustic scenario remains the same (e.g., the driving signals remain a mono signal). However, a change in the acoustic scenario (e.g., the mono signal changing to a stereo signal) may result in audible artifacts.

For example, a common echo canceller configuration is based on adaptive filters that have an objective to minimize the mean square difference between their output and the microphone observation. When the loudspeaker signals are not independent, the optimal solution is not unique and the adaptive filters do not identify the individual loudspeaker-microphone transfer functions. If the relation between driving signals of the loudspeakers then suddenly changes (e.g., the acoustic scenario changes), echo cancellation may fail.

According to a conventional approach, distortion or noise may be introduced into one of the played-out loudspeaker signals (thereby causing the loudspeaker signals to become unique), and then the audio system can uniquely determine the transfer functions between the microphone and the loudspeakers. However, the introduction of distortion or noise into the loudspeakers may affect the quality of the audio being played-out. For example, in modern communication scenarios where the loudspeaker signals may correspond to multi-channel music signals, distortion is undesirable. This is particularly true since the masking threshold for a spatial audio signal can be significantly lower when its spatial profile differs from that of the masker and is difficult to predict with existing methods.

SUMMARY

According to an aspect, a method for multi-channel echo cancellation includes receiving a microphone signal and a multi-channel loudspeaker driving signal. The multi-channel loudspeaker driving signal includes a first driving signal that drives a first loudspeaker, and a second driving signal that drives a second loudspeaker. The first driving signal is substantially the same as second driving signal. The microphone signal includes a near-end signal with echo. The method includes determining a unique solution for acoustic transfer functions for a present acoustic scenario based on the microphone signal and the multi-channel loudspeaker driving signal. The acoustic transfer functions includes a first acoustic transfer function and a second acoustic transfer function. The unique solution for the first and second acoustic transfer functions is determined based on time-frequency transforms of observations from the present acoustic scenario and at least one previous acoustic scenario. The method includes removing the echo from the microphone signal based on the first acoustic transfer function and the second acoustic transfer function.

According to some aspects, the method may include one or more of the following features (or any combination thereof). The first transfer function defines transmission characteristics in a room between the microphone and the first loudspeaker, and the second transfer function defines transmission characteristics in the room between the microphone and the second loudspeaker. The method may include updating the unique solution for the first acoustic transfer function and the second acoustic transfer function when the present acoustic scenario changes to a new acoustic scenario. The unique solution for the first and second acoustic transfer functions is non-ambiguous for a combination of the present acoustic scenario and one or more previous acoustic scenarios. The present acoustic scenario is a first time interval in which a first relationship between sound signals played out by the first and second loudspeakers are fixed, and a previous acoustic scenario is a second time interval in which a second relationship between the sound signals is fixed, where the second time interval occurs before the first time interval, and the second relationship is different than the first relationship. The removing the echo from the microphone may include generating an echo replica signal based on the first and second acoustic transfer functions, and subtracting the echo replica signal from the microphone signal.

According to an aspect, a voice-activated speaker device includes a network interface configured to wirelessly connect to a network to receive audio data, a microphone configured to capture a voice-activated command, a first loudspeaker configured to generate a first sound signal, and a multi-channel echo canceller configured to receive a microphone signal and a multi-channel loudspeaker driving signal having the audio data. The multi-channel loudspeaker driving signal includes a first driving signal that drives the first loudspeaker, and a second driving signal that drives a second loudspeaker to generate a second sound signal. The first driving signal is substantially the same as second driving signal, and the microphone signal includes the voice-activated command with echo from the first sound signal and the second sound signal. The multi-channel echo canceller is configured to determine a unique solution for acoustic transfer functions for a present acoustic scenario based on the microphone signal and the multi-channel loudspeaker driving signal. The acoustic transfer functions include a first acoustic transfer function and a second acoustic transfer function, where the unique solution for the first and second acoustic transfer functions is determined based on time-frequency transforms of observations from the present acoustic scenario and at least one previous acoustic scenario. The multi-channel echo canceller is configured to remove the echo from the microphone signal based on the first and second acoustic transfer functions.

According to some aspects, the voice-activated speaker device may include one of more of the above and/or following features (or any combination thereof). The second loudspeaker is included within the voice-activated speaker device. The second loudspeaker is connected to the voice-activated speaker device. The first transfer function defines transmission characteristics in a room between the microphone and the first loudspeaker, and the second transfer function defines transmission characteristics in the room between the microphone and the second loudspeaker. The multi-channel echo canceller is configured to update the unique solution for the first acoustic transfer function and the second acoustic transfer function when the present acoustic scenario changes to a new acoustic scenario. The unique solution for the first and second acoustic transfer functions is non-ambiguous for a combination of the present acoustic scenario and at least one previous acoustic scenario. The present acoustic scenario is a first time interval in which a first relationship between sound signals played out by the first and second loudspeakers are fixed, and a previous acoustic scenario is a second time interval in which a second relationship between the sound signals is fixed, where the second time interval occurs before the first time interval, and the second relationship is different than the first relationship. The multi-channel echo canceller is configured to generate an echo replica signal based on the first and second acoustic transfer functions and subtract the echo replica signal from the microphone signal.

According to an aspect, a non-transitory computer-readable medium storing executable instructions that when executed by at least one processor cause the at least one processor to receive a microphone signal and a multi-channel loudspeaker driving signal, where the multi-channel loudspeaker driving signal includes a first driving signal that drives a first loudspeaker, and a second driving signal that drives a second loudspeaker, the first driving signal is substantially the same as second driving signal, the microphone signal includes a near-end signal with echo, determine a unique solution for acoustic transfer functions for a present acoustic scenario based on the microphone signal and the multi-channel loudspeaker driving signal, where the acoustic transfer functions includes a first acoustic transfer function and a second acoustic transfer function, and the unique solution for the first and second acoustic transfer functions is determined based on time-frequency transforms of observations from the present acoustic scenario and at least one previous acoustic scenario, and remove the echo from the microphone signal based on the first acoustic transfer function and the second acoustic transfer function.

According to some aspects, the non-transitory computer-readable medium may include one or more of the above and/or following features (or any combination thereof). The first transfer function defines transmission characteristics in a room between the microphone and the first loudspeaker, and the second transfer function defines transmission characteristics in the room between the microphone and the second loudspeaker. The executable instructions include instructions to update the unique solution for the first acoustic transfer function and the second acoustic transfer function when the present acoustic scenario changes to a new acoustic scenario. The one or more previous acoustic scenarios may include a first previous acoustic scenario and a second previous acoustic scenario, where the unique solution for the first and second acoustic transfer functions is non-ambiguous for a combination of the present acoustic scenario, the first previous acoustic scenario, and the second previous acoustic scenario. The present acoustic scenario is a first time interval in which a first relationship between sound signals played out by the first and second loudspeakers are fixed, and a previous acoustic scenario is a second time interval in which a second relationship between the sound signals is fixed, where the second time interval occurs before the first time interval, and the second relationship is different than the first relationship. The executable instructions include instructions to generate an echo replica signal based on the first and second acoustic transfer functions, and subtract the echo replica signal from the microphone signal.

The details of one or more implementations are set forth in the accompanying drawings and the description below. Other features will be apparent from the description and drawings, and from the claims.

BRIEF DESCRIPTION OF THE DRAWINGS

FIG. 6 shows an example of a computer device and a mobile computer device according to an aspect.

DETAILED DESCRIPTION

The embodiments discussed herein disclose an audio system that includes a multi-channel echo canceller configured to determine a unique solution for acoustic transfers functions between a microphone and two or more loudspeakers transmitting non-unique loudspeaker signals even when the acoustic scenario changes and without introducing noise or distortion into one or more of the loudspeaker signals. The multi-channel echo canceller uniquely determines the acoustic transfer functions between the microphone and the loudspeakers based on observations from a present acoustic scenario and one or more previous acoustic scenarios. In some examples, the multi-channel echo canceller uniquely determines the acoustic transfer functions based on time-frequency transforms of the observations from the present acoustic scenario and one or more previous acoustic scenarios. For example, the multi-channel echo canceller may obtain a solution for the acoustic transfer functions in the present acoustic scenario that i) is optimal for the present acoustic scenario, and ii) is optimal for each previous acoustic scenario under the constraint that it is optimal for acoustic scenarios after the previous acoustic scenario up to the present acoustic scenario. In some examples, the term optimal may refer to the situation where the echo is exactly cancelled in the present acoustic scenario for the formulated problem, but the problem formulation is an approximation to the real world. For example, in practice, echo may not be exactly cancelled because there is noise and the room may change (e.g., temperature affects the speed of sound, movement of people, etc.). Hence, the cancellation is approximate, and being more accurate if the approximation is good. However, in contrast to one or more conventional solutions, the multi-channel echo canceller does not require distortion (perturbation) of signals played out over the loudspeakers.

Using the determined acoustic transfer functions, the multi-channel echo canceller can determine the contribution of the driving signal to the signal in the microphone. That contribution may change over time since it may be dependent on a number of factors such as temperature (e.g., the speed of sound changes with the temperature), arrangement of the furniture, where people are located, etc. As such, the multi-channel echo canceller may update the acoustic transfer functions over time based on the most recent available information about the acoustic transfer functions and exploits previous information for those aspects where the recent information is inadequate.

Figure 1:
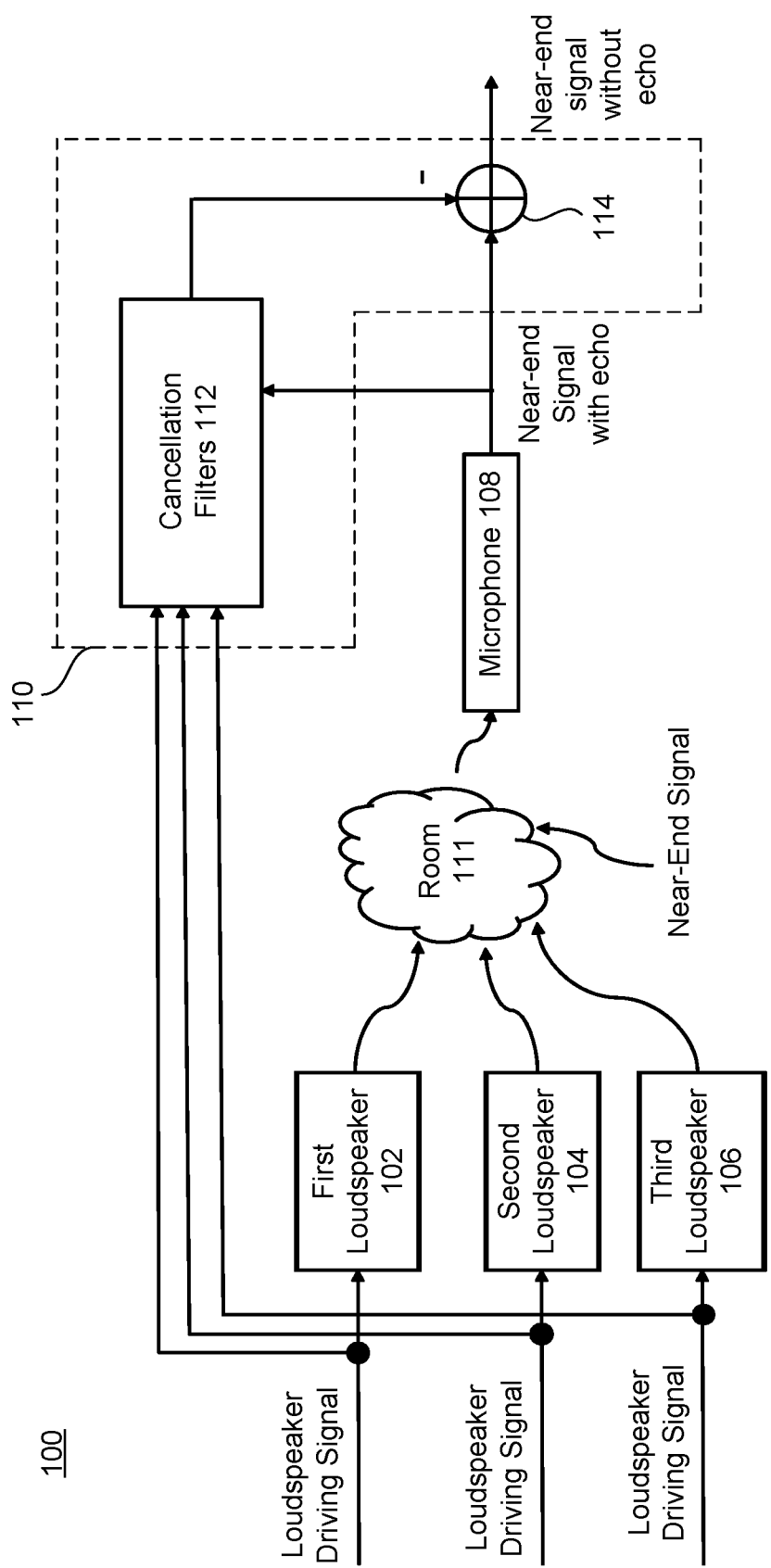
FIG. 1 illustrates an audio system having a multi-channel echo canceller according to an aspect.

FIG. 1 illustrates an audio system 100 having a multi-channel echo canceller 110 according to an aspect. The audio system 100 also includes a microphone 108, a first loudspeaker 102 and a second loudspeaker 104. In some examples, the audio system 100 includes a third loudspeaker 106. In some examples, the audio system 100 may include more than three loudspeakers. In some examples, the audio system 100 may include more than two microphones. The first loudspeaker 102, the second loudspeaker 104, and the third loudspeaker 106 may be disposed at different locations in a room 111.

The audio system 100 may include any type of device (or multiple devices) that have at least one microphone and two or more loudspeakers. In some examples, the audio system 100 is a voice-activated speaker device. In some examples, the audio system 100 includes one or more computing devices. In some examples, the audio system 100 is a teleconference audio system or device.

Each of the first loudspeaker 102, the second loudspeaker 104, and the third loudspeaker 106 may be an electroacoustic transducer that converts a loudspeaker driving signal into a corresponding sound signal. For example, the first loudspeaker 102 generates a first sound signal according to a first loudspeaker driving signal, the second loudspeaker 104 generates a second sound signal according to a second loudspeaker driving signal, and the third loudspeaker 106 generates a third sound signal according to a third loudspeaker driving signal. In some examples, the first loudspeaker driving signal, the second loudspeaker driving signal, and the third loudspeaker driving signals are substantially the same. In some examples, the loudspeaker signal signals are not statistically independent signals.

The microphone 108 may be a transducer that converts sound into an electrical microphone signal. In some examples, a near-end signal is produced, which is captured by the microphone 108, but the microphone signal also contains acoustic echo caused by the proximity of the loudspeakers 102, 104, and 106 to the microphone 108. For example, acoustic echoes may be created when the loudspeaker driving signals are broadcast by the loudspeakers 102, 104, and 106, and picked up by the microphone 108 either directly or indirectly by acoustic reflections off objects of the room 111 in which the loudspeakers 102, 104, and 106 are located. Echoes of the audio signal of the loudspeakers 102, 104, and 106 are combined with the near-end signal. In some examples, the near-end signal is a signal that is processed by the audio system 100, but the near-end signal with echo may cause problems with the processing of the microphone signal.

In particular, when sounds are output by the loudspeakers 102, 104, and 106 in the room 111, and those sounds are captured by the microphone 108, how much sound from each loudspeaker 102, 104, and 106 will reach the microphone 108 can be characterized by an acoustic transfer function h(k) (where k is a digital sample) for each speaker-to-microphone relationship. For example, a first acoustic transfer function defines the relationship of the first loudspeaker 102 and the microphone 108, a second acoustic transfer function defines the relationship of the second loudspeaker 104 and the microphone 108, and a third acoustic transfer function defines the relationship between the third loudspeaker 106 and the microphone 108. If these acoustic transfer functions can be obtained, then by adjusting for the time delay between sound being output by the loudspeakers 102, 104, and 106 and being captured by the microphone 10, and filtering the time-delayed sound to reproduce the acoustic transfer functions, the sound output by each loudspeaker 102, 104, and 106 can be subtracted from the captured ambient sounds.

An acoustic echo cancellation system may use adaptive filters to estimate the acoustic transfer functions by modeling the impulse response of the room 111 in view of the loudspeakers 102, 104, and 106, and the microphone 108. For example, each of the loudspeakers 102, 104, and 106 has one scalar impulse response for the microphone 108. The impulse response of the room 111 can be used to predictively characterize the signals that will be captured by the microphone 108 when presented with an input signal, referred as an impulse. The impulse response may describe the reaction of the audio system 100 as a function of time, and the impulse may have its own frequency response. In addition, the acoustic transfer functions can change dynamically, such as when movement of something in the room 111 alters the acoustics of the room 111. As a result, it may be necessary to continually update the acoustic transfer functions to maintain good echo cancellation.

However, a non-uniqueness problem exists in multi-channel echo cancellation systems when updating the acoustic transfer functions. When the loudspeaker driving signals are the same or not statistically independent (e.g., perfectly or highly correlated), there can be more than one cancellation solution to estimate the acoustic transfer functions between the loudspeakers 102, 104, and 106 and the microphone 108. When the cancellation solution is not unique, the acoustic transfer functions are not determined, and then if a change to the acoustic scenario occurs, echo cancellation may fail, thereby resulting in audible artifacts.

However, according to the embodiments discussed herein, the multi-channel echo canceller 110 may uniquely determine the acoustic transfers functions between the microphone 108 and two or more of the loudspeakers 102, 104, and 106 transmitting non-unique loudspeaker signals even when the acoustic scenario changes and without introducing noise or distortion into one or more of the loudspeaker driving signals. For example, in the case where at least two of the sounds signals are not statistically different, the multi-channel echo canceller 110 is configured to remove the echo from the microphone signal using the unique acoustic transfer functions even when the relation between the loudspeaker driving signals changes.

The multi-channel echo canceller 110 may include cancellation filters 112, and a subtractor 114. The cancellation filters 112 may uniquely determine the acoustic transfer functions and generate an echo replica signal that replicates the echo using the determined acoustic transfer functions. For example, the echo replica signal may be a signal that is the loudspeaker driving signals distorted by the room 111 represented by the acoustic transfer functions. The subtractor 114 is configured to subtract the echo replica signal from the microphone signal (having the near-end signal with echo) to obtain the near-end signal without the echo.

Figure 2:
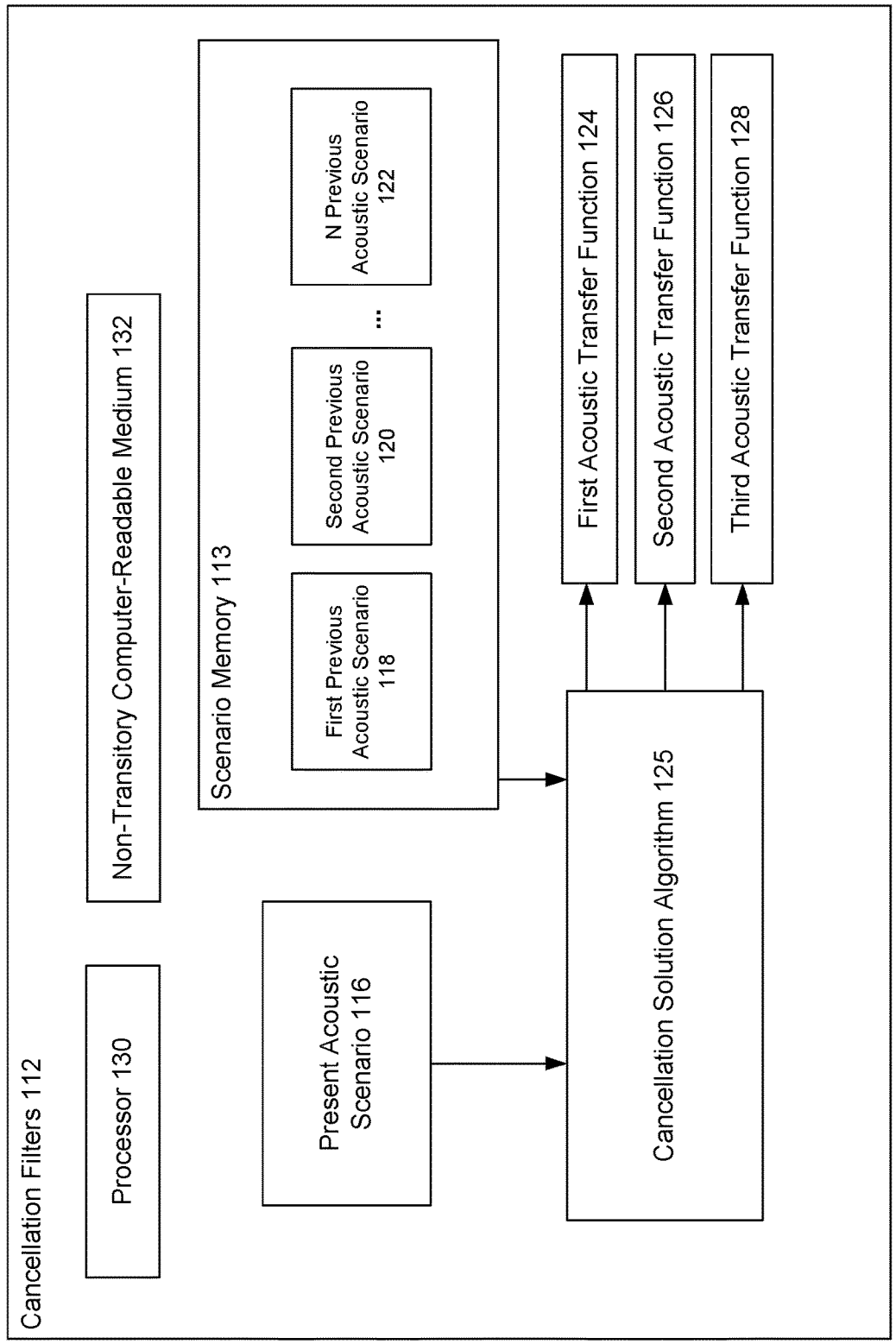
FIG. 2 illustrates cancellation filters of the multi-channel echo canceller according to an aspect.

FIG. 2 illustrates the cancellation filters 112 according to an aspect. The cancellation filters 112 include a processor 130 and a non-transitory computer-readable medium 132 having executable instructions that when executed by the processor 130 is configured to implement the operations discussed herein.

Referring to FIGS. 1 and 2, the cancellation filters 112 are configured to receive a multi-channel driving signal that includes the first loudspeaker driving signal for driving the first loudspeaker 102 and the second loudspeaker driving signal for driving the second loudspeaker 104. When the audio system 100 includes the third loudspeaker 106, the multi-channel driving signal also includes the third loudspeaker driving signal for driving the third loudspeaker 106. The multi-channel echo canceller 110 may also receive the microphone signal (e.g., near-end signal with echo).

Then, the cancellation filters 112 are configured to uniquely determine the acoustic transfer functions using a cancellation solution algorithm 125 inputted with the microphone signal and the multi-channel driving signal such that unique acoustic transfer functions are obtained using observations from a present acoustic scenario 116 and one or more acoustic scenarios stored in a scenario memory 113. In this context, "uniqueness" may mean that there is only one solution possible for each of the transfer functions. The unique acoustic transfer functions may include a first acoustic transfer function 124 that defines the relationship between the microphone 108 and the first loudspeaker 102, a second acoustic transfer function 126 that defines the relationship between the microphone 108 and the second loudspeaker 104, and a third acoustic transfer function 128 that defines the relationship between the microphone 108 and the third loudspeaker 106 (if the audio system 100 includes the third loudspeaker 106. Accordingly, if the audio system 100 includes more than three loudspeakers, the unique acoustic transfer functions include a fourth acoustic transfer function, a fifth acoustic transfer function, and so forth.

The cancellation filters 112 estimate the acoustic transfer functions 124, 126, 128 for the present acoustic scenario 116 and one or more previous acoustic scenarios of the scenario memory 113 using the cancellation solution algorithm 125 until a unique cancellation solution is obtained. It is noted that the unique cancellation solution refers to the determination of the proper coefficients for the acoustic transfer functions 124, 126, and 128. For example, all of the acoustic scenarios (individually) may have a non-unique cancellation solution. However, the cancellation filters 112 are configured to find the cancellation solution that is the optimal solution for a past acoustic scenario subject to the constraint that it is an optimal solution from that past acoustic scenario forward in time until the present acoustic scenario. With this approach, the cancellation filters 112 naturally restrict the scenario memory 113 to what is needed to find a unique cancellation solution, and uniquely defines the acoustic transfer functions.

For example, the cancellation filters 112 may attempt to uniquely determine the acoustic transfer functions 124, 126, 128 based on observations from the present acoustic scenario 116 and a first previous acoustic scenario 118. The first previous acoustic scenario 118 may be the acoustic scenario that immediately precedes the present acoustic scenario 116. The present acoustic scenario may be a first time interval in which a first relationship between sound signals played out by the first loudspeaker 102 and the second loudspeaker 104 is fixed (e.g., does not change during the first time interval). The first previous acoustic scenario 118 may be a second time interval (i.e., previous time interval) in which a second relationship between the sound signals played out by the first loudspeaker 102 and the second loudspeaker 104 is fixed (e.g., does not change during the second time interval), where the second relationship is different than the first relationship, and the second time interval occurs before the first time interval.

For example, the first loudspeaker 102 and the second loudspeaker 104 may be playing out a mono signal for a period of time (i.e., the second time interval), and then the audio system 100 may switch to a stereo signal, and the first loudspeaker 102 and the second loudspeaker 104 plays out the stereo signal for another period of time (i.e., the first time interval). The first time interval relates to a different acoustic scenario than the second time interval because the relationship between the two loudspeakers has changed. As such, any change in the relationship between the loudspeakers 102, 104, and 106 defines a different acoustic scenario, and, over time, there may be a number of acoustic scenarios, which are exploited by the cancellation filters 112 to uniquely determine the acoustic transfer functions.

If the cancellation filter 112 cannot uniquely determine the acoustic transfer functions 124, 126, 128 based on the observations from the present acoustic scenario 116 and the first previous acoustic scenario 118, the cancellation filters 112 attempt to uniquely determine the acoustic transfer functions 124, 126, 128 based on a combination of observations from the present acoustic scenario 116, the first previous acoustic scenario 118, and a second previous acoustic scenario 120. The second previous acoustic scenario 120 may be the acoustic scenario that immediately precedes the first previous acoustic scenario 118. If the cancellation filters 112 cannot uniquely determine the acoustic transfer functions 124, 126, 128 based on the observations from the present acoustic scenario 116, the first previous acoustic scenario 118, the second previous acoustic scenario 120, the cancellation filters 112 attempt to uniquely determine the acoustic transfer functions 124, 126, 128 based on a combination of observations from the present acoustic scenario 116, the first previous acoustic scenario 118, the second previous acoustic scenario 120, and a third previous acoustic scenario that immediately precedes the second previous acoustic scenario 120. The cancellation filters 112 may continue to evaluate previous acoustic scenarios (until N previous acoustic scenario 122) until a unique cancellation solution is obtained. In this manner, distortion is not needed to make the sound signals independent, and the cancellation filters 112 store the most up-to-date information about the acoustic transfer functions 124, 126, and 128 because characteristics about the room 111 may change.

Figure 3:
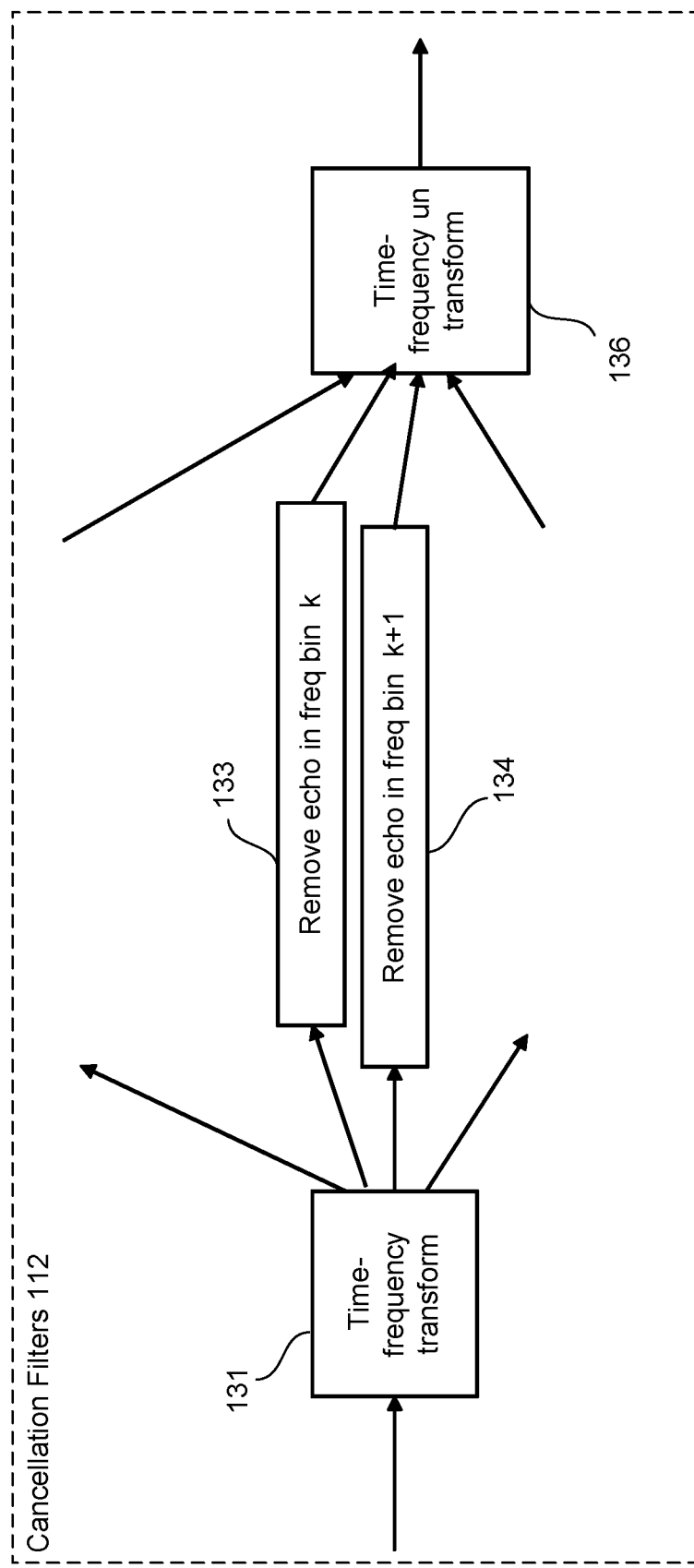
FIG. 3 illustrates the cancellation filters of the multi-channel echo canceller according to an aspect.

FIG. 3 illustrates an example of the cancellation filters 112 according to an aspect. The cancellation filters 112 are configured to perform a time-frequency transform 131 (e.g., a forward transform) of the acoustic signals (e.g., the multi-channel driving signal, microphone signal) for the present acoustic scenario 116 and one or more previous acoustic scenarios (e.g., the first acoustic scenario 118, the second previous acoustic scenario 120 through N previous acoustic scenario 122). At each frequency, the cancellation filters 112 are configured to remove the echo in the corresponding frequency bin. For example, at operation 133, the cancellation filters 112 are configured to remove the echo in frequency bin k. In some examples, the operation 133 may include two steps, where the first step is a model identification step. The first step characterizes the effect of the room 111 by means of a transfer function that provides a linear relation between the loudspeaker signal and the microphone response. The second step is use the loudspeaker signal and the transfer function to compute the expected contribution of the loudspeaker signal in the observed microphone signal. This contribution is then subtracted to obtain the echo-free signal. In practice, estimates have errors and the output will be an approximation of an error-free signal. At operation 134, the cancellation filters 112 are configured to remove the echo in frequency bin k+1 using the operations described with reference to operation 133. Then, the cancellation filters 112 are configured to perform a time-frequency un-transform 136 (e.g., a back transform).

Figure 4A:
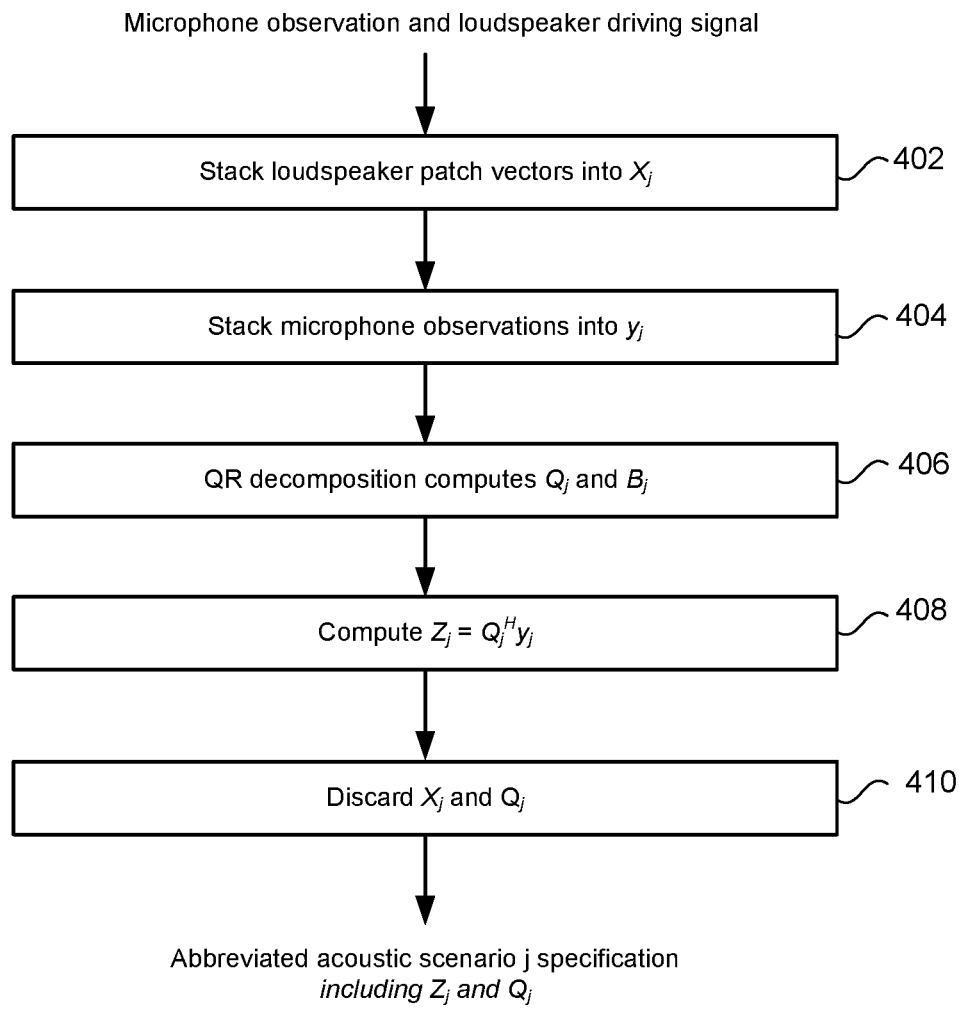
FIG. 4A illustrates a flowchart depicting example operations of the cancellation filters according to an aspect.
Figure 4B:
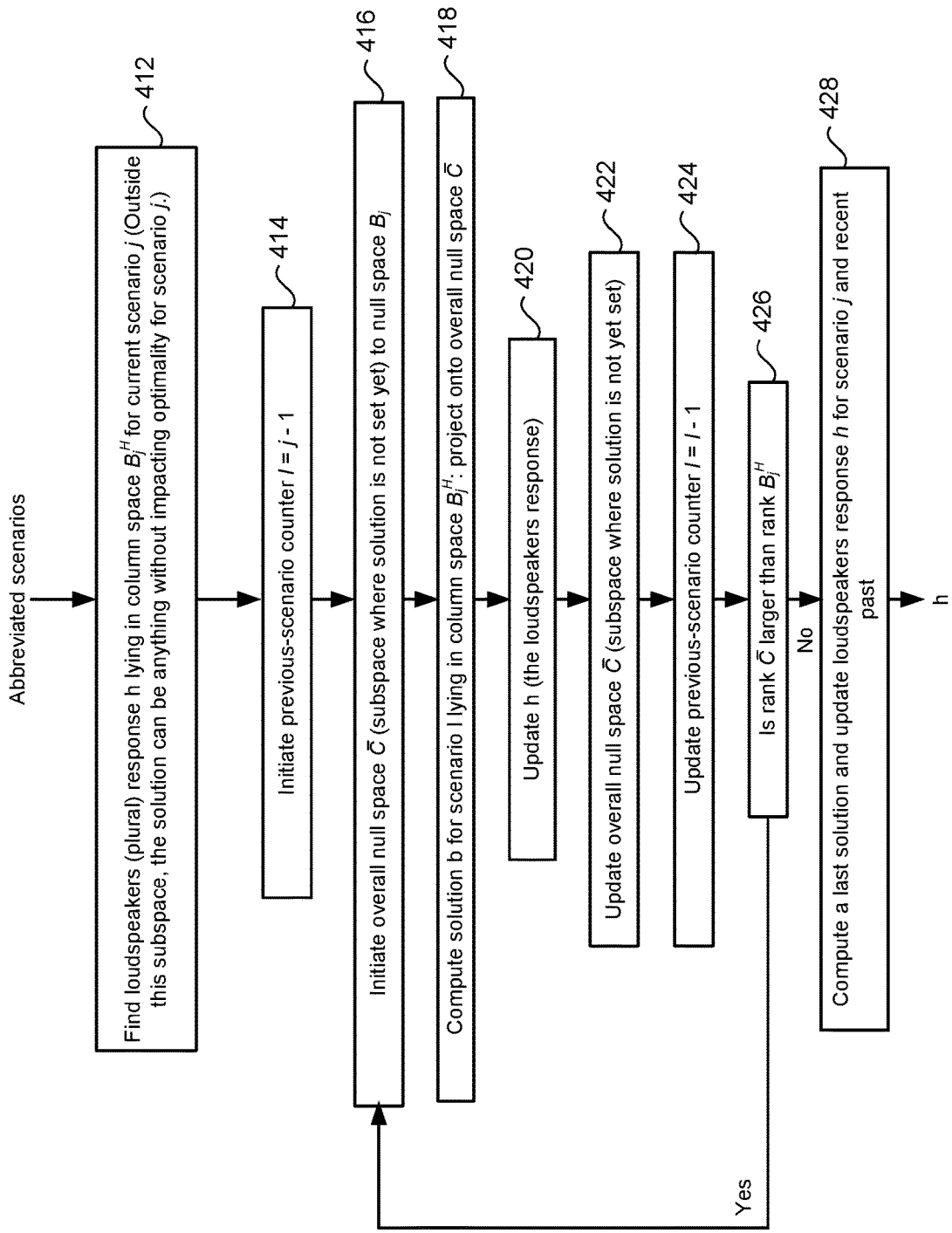
FIG. 4B illustrates example operations of the flowchart of FIG. 4A according to an aspect.

FIGS. 4A and 4B illustrate a flowchart 400 depicting example operations of the cancellation solution algorithm 125 of the cancellation filters 112 according to an aspect. The principle of the cancellation solution algorithms 125 is as follows: An echo-free microphone signal is computed from the input of scalar microphone signal y and a multi-channel loudspeaker signal x in a stepwise process for each frequency channel k: An estimate h for the loudspeaker impulse response is computed for each previously observed acoustic scenario j. For example, as indicated above, the cancellation requires a first step that includes estimating the transfer functions between loudspeakers and microphones. The transfer functions provide the microphone signals for the given loudspeaker signals. The estimation of the loudspeaker signals involves solving a set of linear equations that are based on observed loudspeaker signals and corresponding observed microphone signals. If for a particular acoustic scenario A some of the loudspeakers signal are substantially the same, then the solution of the linear equations is not unique. That is, the estimated transfer functions are not unique for that acoustic scenario. This means that there is a subspace where the components of the transfer functions can be chosen freely and yet satisfy the equations for the particular scenario A. For convenience, this subspace may be referred to as the null-space. The transfer functions are fully determined in the complement of the null space. To make the overall solution unique, additional equations are needed.

For example, a first previous acoustic scenario may be referred to as scenario B. Like scenario A, the transfer functions of scenario B are determined by a set of linear equations that are based on loudspeaker and microphone data. The cancellation solution algorithm 125 processes the equations of scenario B such that they only apply to the null-space found from scenario A. Based on the processed equations of scenario B, the cancellation solution algorithm 125 attempts to solve for the transfer function component in the null-space to make the transfer function unique. The solution of the component of the transfer function in the null space based on scenario B may reduce or remove the null space. If it is not unique, the cancellation solution algorithm 125 may repeat the procedure with a scenario C.

Details are shown in the steps of FIGS. 4A and 4B and will be described in detail with a mathematical formalization in the following. As shown in FIG. 4A, for a frequency bin k, the cancellation filters 112 receive the multi-channel driving signal and the microphone signal (i.e., the microphone observation), stacks the loudspeaker path vectors into $X_j$ (operation 402) and stacks microphone observations into $y_j$ (operation 404). The cancellation filters 112 perform a QR decomposition (i.e., $X_j = Q_j B_j$) that computes $Q_j$ and $B_j$ (operation 406), computes $Z_j = Q_j^H y_j$ (operation 408), and discards $X_j$ and $Q_j$ (operation 410). After the operation 410, the cancellation filters 112 obtain the abbreviated acoustic scenario j specification including $Z_j$ and $Q_j$.

As shown in FIG. 4B, the cancellation filters 112 receive the abbreviated scenarios, and obtains the loudspeakers (plural) response h lying in column space $B_j^H$ for current scenario j (operation 412). Outside this subspace, the solution can be anything without impacting optimality for scenario j. The cancellation filters 112 initiate previous-scenario counter l=j−1 (operation 414), initiates overall null space C (subspace where solution is not set yet) to null space $B_j$ (operation 416), computes solution b for scenario 1 lying in column space $B_j^H$ and projects onto overall null space C (operation 418), updates h (the loudspeakers response) (operation 420), updates overall null space C (subspace where solution is not yet set) (operation 422), updates previous-scenario counter l=l−1 (operation 424), and makes a determination on whether rank C is larger than rank $B_j^H$ (operation 426). If yes, the operation proceeds back to operation 416. If no, the cancellation filters 112 compute a last solution and updates loudspeakers response h for scenario j and recent past (operation 428).

Figure 5:
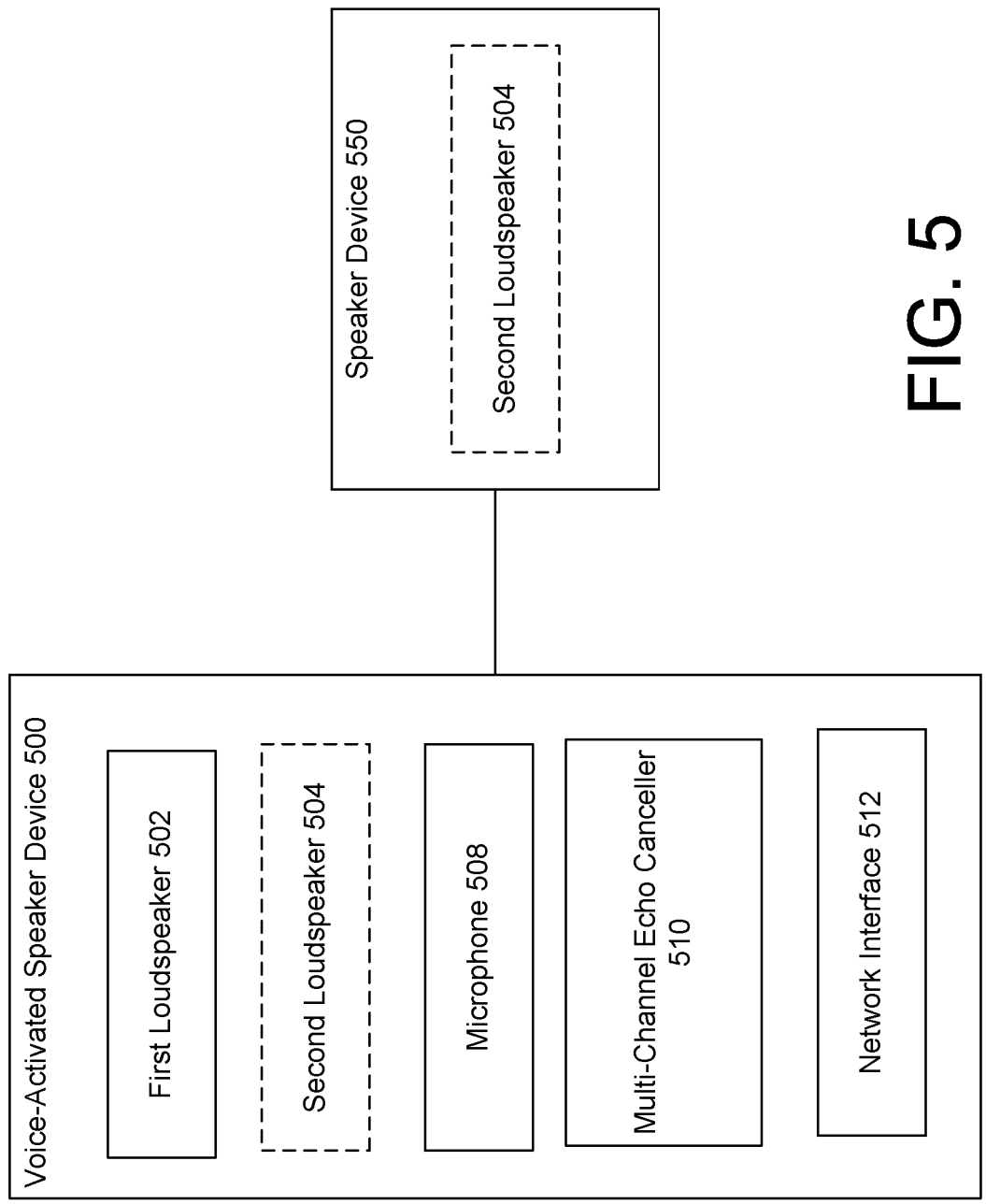
FIG. 5 illustrates a voice-activated speaker device having the multi-channel echo canceller according to an aspect.

FIG. 5 illustrates a voice-activated speaker device 500 having a multi-channel echo canceller 510. The multi-channel echo canceller 510 may be the multi-channel echo canceller 110, and may include any of the features described herein. The voice-activated speaker device 500 may also have a first loudspeaker 502, a microphone 508, and a network interface 512 configured to wirelessly connect to a network (e.g., Internet) to receive audio data that is played out by the first loudspeaker 502. The microphone 508 may capture a voice-command that can control the content and an operation of the voice-activated speaker device 500. In some examples, the voice-activated speaker device 500 is a type of wireless speaker and voice command device with an integrated virtual assistant that provides interactive actions. In some examples, the voice-activated speaker device 500 includes a second loudspeaker 504 (e.g., the first loudspeaker and the second loudspeaker are included within a housing of the voice-activated speaker device 500). In some examples, the voice-activated speaker device 500 is connected (wireless or wired connection) to a speaker device 550, and the speaker device 550 includes the second loudspeaker 504. In some examples, the speaker device 550 is another voice-activated speaker device 500.

In some examples, a user may provide a voice-command captured by the microphone 508 that begins the playback of music through the first loudspeaker 502 and the second loudspeaker 504 during a first acoustic scenario. The loudspeaker driving signals for the first loudspeaker 502 and the second loudspeaker 504 are the same since it is the same music being played on both of the loudspeakers. In some examples, a different signal may be played out over the first loudspeaker 502 and the second loudspeaker 504 during a second acoustic scenario. Then, the user may provide another voice-command, which is captured by the microphone 508, and the multi-channel echo canceller 510 is configured to remove the echo from the microphone signal having the voice-command so that any speech recognition performed by the voice-activated speaker device 500 can perform properly.

Formal Aspects of Disclosure

The following description provides formalization and mathematical proofs of the above-described multi-channel echo canceller 110. In section 1, the basic operation of an echo canceller for the case that the solution is unique is reviewed. In this section, there is a description of a direct solution method, avoiding adaptive filtering (e.g., adaptive filtering may converge to the same solution). As discussed below, the direct solution method may be particularly convenient when considering a sequence of acoustic scenarios. In section 2, various aspects of the multi-channel echo canceller 110 are described.

Section 1—Solution for the Full-Rank Scenario

To introduce notation and provide a means for illustrating the problems of multi-channel echo cancellation, a solution is provided for the case where the echo cancellation is unique in this section. For this illustrative solution, a block-analysis approach is used rather than an adaptive-filter approach. That is, all signals are considered to be stationary processes and a segment of these processes is analyzed.

Section 1.1—Problem Formulation

Let $x=\{x_n\}_{n\in\mathbb{Z}}$ be a stationary real-valued vector discrete-time ergodic stochastic vector process that is $\mathbb{R}^{L\times 1}$ valued representing the known driving signals of L loudspeakers (e.g., loudspeakers 102, 104, 106 of FIG. 1). Furthermore, let $y=\{y_n\}_{n\in\mathbb{Z}}$ be a stationary scalar real-valued scalar discrete-time ergodic stochastic process describing the microphone signal (e.g., the microphone signal captured by microphone 108). Then, a room (e.g., the room 111 of FIG. 1) can be approximated using a time-invariant room operator $h=\{h_m\}_{m\in\{0,\ldots,M-1\}}$ with $h_m \in \mathbb{R}^{L\times 1}$, such that:

$$y_n = \Sigma_{m=0}^{M-1} h_m^H x_{n-m} + g_n, \qquad \text{Eq. (1)}$$

where $\cdot^H$ is the Hermitian transpose, and g is a real-valued scalar stochastic error process representing both the near-end signal and the noise going into the room 111. Note that when L=1, Eq. (1) reduces to a straightforward convolution of a scalar x with a scalar impulse response h. $h_m$ may be considered the cancellation filters 112, and attempt to represent the effect of the room 111 (and any delay and distortion by the loudspeaker and microphone) on the loudspeaker signal before they are observed in the microphone 108.

An objective is to estimate the time-invariant operator h that describes the room unambiguously. It is noted that each element $y_i$ of y is a scalar random variable: $y_i \in L^2(\Omega, B, \mathbb{P})$, where B is a Borel sigma algebra, and $\mathbb{P}$ is a probability measure. This space is equipped with an inner product $\langle v_1, v_2 \rangle = E[v_1 v_2]$, where E is the expectation. The inner product definition induces the 2-norm $\|v_1\| = \sqrt{\langle v_1, v_1 \rangle} = \sqrt{E[v_1^2]}$. Both $\{x_n\}_{n\in\mathbb{Z}}$ and $\{y_n\}_{n\in\mathbb{Z}}$ are observed. An estimate $\hat{h}$ of h can then be found by minimizing the 2-norm:

$$\|y_n - \Sigma_{m=0}^{M-1} \hat{h}_m^H x_{n-m}\|_2. \qquad \text{Eq. (2)}$$

With the minus sign above the subtractor 114 and with the minimization performed, the argument of this two-norm is the output of the subtractor 114.

Section 1.2—Block-Wise Time-Frequency Representation

In some examples, the convolutive nature of Eq. (1) can be cumbersome. To simplify the mathematics, the problem can be reformulated using a time-frequency representation based on frame theory (where the forward transform is the time-frequency transform 131 and the back transform is the time-frequency un-transform 136). To this purpose, let w be a window with finite time support. A time-frequency frame is built by means of time-shift operator $\mathcal{T}$ and frequency-shift operator $\mathcal{F}$. The time-shift and frequency-shift operators are defined as:

$$\mathcal{T}_p w = \{w_{n-pP}\}_{n\in\mathbb{Z}}, \qquad \text{Eq. (3)}$$

$$\mathcal{F}_k w = \{e^{j\omega_0 kn} w_n\}_{n\in\mathbb{Z}}, \qquad \text{Eq. (4)}$$

where $j=\sqrt{-1}$, $k \in \mathcal{K} = \{0, \ldots, |\mathcal{K}|-1\}$ with $|\mathcal{K}| \geq P$ and $$\omega_0 = \frac{2\pi}{|\mathcal{K}|}.$$

A time-frequency frame for $\mathbb{R}$ is constructed as follows:

$$w^{(p,k)} = \mathcal{F}_k \mathcal{T}_p w, p \in \mathbb{Z}, k \in \mathcal{K}, \qquad \text{Eq. (5)}$$

where $w^{(p,k)}$ is a shifted and modulated window function.

The time-frequency transformation of the vector process x is the doubly-indexed vector process $\tilde{x}$ with:

$$\tilde{x}_{p,k} = \Sigma_{n \in \mathbb{Z}} w_n^{(p,k)*} x_n, p \in \mathbb{Z}, k \in \mathcal{K}, \qquad \text{Eq. (6)}$$

where $\cdot^*$ denotes complex conjugation, p is a time index, and k is a frequency index. Eq. (6) can be written as follows:

$$\tilde{x} = Wx. \qquad \text{Eq. (7)}$$

Below is a discussion of some attributes of the discrete time-frequency transform defined by Eq. (7). It is noted that while the Fourier transform of a stationary discrete-time random process cannot be defined, the time-frequency transform of a stationary discrete-time random process may be well-defined. Furthermore, Eq. (6) is the downsampling of the output of a time-invariant operator. This implies that the time-invariant operator h is also time-invariant in the time-frequency domain. A third attribute is that the memory introduced by the response h is limited to one time-sample in the time-frequency domain if P/2>M. In other words, if x is independent-identically distributed (iid) in time, then the time autocorrelation correlation of $E[\tilde{x}_{p,k}^H \tilde{x}_{p+q,k}]=0$ for $|q|>1$ and all $k \in \mathcal{K}$. A fourth attribute is that each $\mathcal{F}_k w$ (discrete Fourier transform) component in the time-frequency transform tends towards the discrete-time Fourier transform with increasing window length and that, hence, approximately decorrelates processes along the frequency index. The decorrelation in the frequency dimension depends on the window selected.

Switching for technical reasons to input sequences in the Hilbert space $l^2(\mathbb{Z})$, it is noted that W can be seen as a composite of partial time-frequency operators $W_k: l^2(\mathbb{Z}) \to l^2(\mathbb{Z})$ that are bounded linear operators corresponding to the functional $x \mapsto \{\tilde{x}_{p,k}\}_{p\in\mathbb{Z}}$. If the $|\mathcal{K}|$ sequences $\{\tilde{x}_{p,k}\}_{p\in\mathbb{Z}}$ are interleaved, and a new sequence index $m=p|\mathcal{K}|+k$ is defined, then a bounded linear operator $W: l^2(\mathbb{Z}) \to l^2(\mapsto \{\tilde{x}_{p,k}\}_{p\in\mathbb{Z}})$ is defined. Importantly, by selecting suitable windows such that $\Sigma_{p\in\mathbb{Z}} w_{n-pP}^2 = 1 \,\forall_{n\in\mathbb{Z}}$, the time-frequency transform that corresponds to a tight frame ($l^2$ norm preserving except for a constant factor) can be ensured.

Based on the above discussion and the time-invariance of the h operator that, in general, for P/2>M, Eq. (1) can be written as:

$$\tilde{y}_{p,k} = \Sigma_{l\in\mathcal{K}} \Sigma_{r=-1}^{1} \tilde{h}_{k,r,l}^H \tilde{x}_{p+r,l} + \tilde{g}_{p,k}, \qquad \text{Eq. (8)}$$

where $\tilde{y}_{p,k} \in \mathbb{C}$ and $\tilde{x}_{p,k} \in \mathbb{C}^{L\times 1}$, and where for later convenience $\tilde{h}_{r,l} \in \mathbb{R}^{L\times 1}$ is defined by an inner product rather than a convolution.

To simplify the notation of Eq. (8), it is denoted by $\check{h}_k$ the stacking of all vectors $\tilde{h}_{k,r,l}$ with indices $r \in \{-1,0,1\}$ and $l \in \mathcal{K}$ and by $\check{x}_{p,k}$ the corresponding stacking of all vectors $\tilde{x}_{p+r,l}$. Then, Eq. (8) can be written as:

$$\tilde{y}_{p,k} = \check{h}_k^H \check{x}_{p,k} + \tilde{g}_{p,k}. \qquad \text{Eq. (9)}$$

In fact, Eq. (9) is of a more general nature than Eq. (8). For each $\tilde{y}_{p,k}$ one can omit from the stacking all those terms where $\check{x}_{p+r,l}$ is not correlated to $\tilde{y}_{p,k}$ and hence does not contribute to Eq. (9). Thus, the dimensionality can be reduced until any pre-set bound on precision is reached for $\tilde{y}$. If a set of vectors $\mathcal{A}_k$ (a time-frequency "patch") in the stacking is retained, then $\check{x}_{p,k} \in \mathbb{C}^{L|\mathcal{A}_k| \times 1}$, and $\check{h}_k \in \mathbb{C}^{L|\mathcal{A}_k| \times 1}$.

The main advantage of the formulation of Eq. (9) over Eq. (1) is the separability into $|\mathcal{K}|$ equations that each have a low number of parameters in $\check{h}_k \in \mathbb{R}^{L|\mathcal{A}_l| \times 1}$. Whereas the operator h is specified by ML parameters in Eq. (1), it is specified with $L|\mathcal{A}_k|$ parameters in Eq. (10) and typically $|\mathcal{A}_k| \ll M$. In general, in manipulations in the time-frequency transform only neighboring frequencies are considered. In the extreme case of $|\mathcal{A}_k|=1$ where only the vector with index (p, k) is retained, the result of Eq. (9) simplifies to the form:

$$\tilde{y}_{p,k} = \check{h}_k^H \check{x}_{pk} + \tilde{g}_{pk}. \qquad \text{Eq. (10):}$$

An approximation similar to that of Eq. (10) often results in errors that may be significant for the task performed. However, the formulation of Eq. (10) is commonly used as its low computational complexity outweighs the limitations in its performance.

Section 1.3—Estimating the Transfer Function

It is now considered how to estimate the $\check{h}_k^H$ from observations x and y. That is, as indicated above, the available realizations of the ergodic stochastic processes x and y are obtained. Because the processes are ergodic, the expectation operator can be replaced with averaging in time. In practice, the expectation operator can be approximated with averaging over a finite set of observations. First, it is noted that the realization of Eq. (9) is $$\tilde{y}_{p,k} = \check{h}_k^H \check{x}_{pk} + \tilde{g}_{pk}. \qquad \text{Eq. (11):}$$

The $\mathfrak{P}$ realizations of Eq. (11) are stacked to obtain:

$$\begin{bmatrix} \tilde{y}_{0,k} \\ \vdots \\ \tilde{y}_{\mathfrak{P}-1,k} \end{bmatrix} = \begin{bmatrix} \check{x}_{0,k}^H \\ \vdots \\ \check{x}_{\mathfrak{P}-1,k}^H \end{bmatrix} \check{h}_k + \begin{bmatrix} \tilde{g}_{0,k} \\ \vdots \\ \tilde{g}_{\mathfrak{P}-1,k} \end{bmatrix}, \qquad \text{Eq. (12)}$$

where, without loss of generality, the time interval is $p \in \{0, \ldots, \mathfrak{P}-1\}$. This corresponds to operations 402 and 404 in FIG. 4A.

In the following, $\check{h}_k$ is found in Eq. (12) for the case $\mathfrak{P} \geq L|\mathcal{A}_k|$. To reduce notational clutter, indices and modifiers are omitted that do not change where that does not lead to ambiguity, and Eq. (12) is written as:

$$y = Xh + g, \qquad \text{Eq. (13):}$$

where $y \in \mathbb{C}^{\mathfrak{P} \times 1}$ and $X \in \mathbb{C}^{\mathfrak{P} \times L|\mathcal{A}|}$. Note that the rows of X label time, and the columns label features relevant to a frequency k.

The solution of Eq. (13) is straightforward if $\check{x}$ is full column rank. The simplest approach is to minimize the 2-norm of $\tilde{g}$ (the near-end signal and system error) to obtain the estimate:

$$\hat{h} = X^\# y, \qquad \text{Eq. (14):}$$

where $\cdot^\#$ labels the pseudo-inverse and $\hat{\cdot}$ is an estimate.

The covariance $E[\check{x}_{p,k} \check{x}_{p,k}^H]$ is sometimes singular or nearly singular. This may lead to numerical problems when computing $X^\#$ because $X^H X$ is then generally nearly singular. There are two natural causes for $E[\check{x}_{p,k} \check{x}_{p,k}^H]$ to be singular or nearly singular. First, the patch $\mathfrak{P}$ includes random vectors $x_{q,l}$ uncorrelated with the random vector $y_k$. Second, the loudspeaker signals are not independent. The first cause generally does not vary in time in a practical environment and hence does not cause problems in multi-channel echo cancellation. However, the second cause can be a problem as the loudspeaker signals may suddenly become dependent because of a change in the input signals to the loudspeakers. In other words, a change in the far-end arrangement may cause problems in multi-channel echo cancellation.

Below is a discussion of the effect of X not being full column rank. This scenario is a limiting case of a practical situation where its singular values are small but usually do not vanish. Let the columns of Q be a subspace basis that spans the column space of X so that $X = QB$, where $Q^H Q = I$. Note that B is either a fat matrix (when X is not full column rank), or square (when X is full column rank). This decomposition can either be obtained using a QR decomposition or using singular-value decomposition (SVD). Note, the formulation only retains nonzero columns of Q, which means that $Q \in \mathbb{C}^{\mathfrak{P} \times \mathfrak{Q}}$ where $\mathfrak{Q} \leq L|\mathcal{A}_k|$.

Then, a solution for $\hat{h}$ can be obtained as follows:

$$\hat{h} = \operatorname{argmin}_{v \in \mathbb{C}^{N \times 1}} \|y - Xv\|_2 \qquad \text{Eq. (15)}$$

$$= \operatorname{argmin}_{v \in \mathbb{C}^{N \times 1}} \|y - QBv\|_2 \qquad \text{Eq. (16)}$$

$$= \operatorname{argmin}_{v \in \mathbb{C}^{N \times 1}} \|Q^H y - Q^H QBv\|_2 \qquad \text{Eq. (17)}$$

$$= \operatorname{argmin}_{v \in \mathbb{C}^{N \times 1}} \|Q^H y - Bv\|_2 \qquad \text{Eq. (18)}$$

The minimum 2-norm $\hat{h}$ estimate is found as:

$$\hat{h} = B^H (BB^H)^{-1} Q^H y. \qquad \text{Eq. (19):}$$

More generally, it can be seen that:

$$\hat{h} = B^H (BB^H)^{-1} Q^H y + P_B^{\mathcal{N}} b, \qquad \text{Eq. (20):}$$

where $P_B^{\mathcal{N}}$ is the projection onto the null space of B, with arbitrary b, describes the set of solutions of Eq. (15).

The same formulation can be used to study the error in $\hat{h}$. Using Eq. (15) and Eq. (13), the following equations are obtained:

$$\hat{h} = \operatorname{argmin}_{v \in \mathbb{C}^{N \times 1}} \|y - Xv\|_2 \qquad \text{Eq. (21)}$$

$$= \operatorname{argmin}_{v \in \mathbb{C}^{N \times 1}} \|Q^H g + B(h - v)\|_2. \qquad \text{Eq. (22)}$$

It then follows that the error of the estimate is $$\hat{h} - h = B^H (BB^H)^{-1} Q^H g + P_B^{\mathcal{N}} b, \qquad \text{Eq. (23):}$$

where $P_B^{\mathcal{N}}$ is the projection onto the null space of B and b is an arbitrary vector. The error component $B^H (BB^H)^{-1} Q^H g$ decreases with increasing $\mathfrak{P}$ if g is independent of x, which in most real-world scenarios is accurate. If the acoustic arrangement is time-invariant, then block-based methods may suffer less from near-end signals (e.g., double-talk) than adaptive-filter based methods as no learning rate is involved. This is because the subspaces spanned up by the columns of Q and g spanning up a progressively smaller portions of the overall space.

From both Eq. (20) and Eq. (23), the standard problem is observed in multi-channel echo cancellation. At times, $\hat{h}$ may not be unique as the null-space of B is not empty. Thus, if one acoustic scenario is moved to another where the rows of X span up a different subspace (or the full space), then echo cancellation will fail up to the time that the computation of a proper new estimate is completed.

Adding a mild Tikhonov regularization term $\varepsilon v^H v$ to Eq. (18) will make b vanish even for the case that the null-space of B is not empty. However, the problem is solved only in a subspace. Regularization is advantageous in the sense that the estimate will at least not lead to amplification of the signal components in a new block that appear in the null space of the X matrix used.

When adaptive algorithms are used, the results are similar. For adaptive algorithms a learning rate must be specified and the estimate $\hat{h}$ converges to an optimal solution in the row space of X over time. With regularization it will suppress the signal in the null space of X. When the far-end scenario changes, an echo will occur until the adaptive system has learned the full transfer function. A problem with adaptive algorithms is that they tend to unlearn behavior for subspaces that have not been used recently. Hence echoes will occur again after an underspecified scenario has occurred.

Section 2—A Method to Address Rank-Deficient Scenarios

In the following a sequence of acoustic scenarios labeled $j \in \mathbb{Z}$ is considered. The acoustic scenarios (e.g., present acoustic scenario 116, first previous acoustic scenario 118, second previous acoustic scenario 120 to N previous acoustic scenario 122 of FIG. 2) can be of different time duration, and a sequence of pairs $\{y_j, X_j\}_{j \in \mathbb{Z}}$ is obtained. Some of these acoustic scenarios may have an $X_j$ that is nearly singular. The multi-channel echo canceller 110 is configured to obtain the solution $\hat{h}$ to be optimal for the present acoustic scenario 116 (or current block), while retaining relevant information from previous acoustic scenarios (or previous blocks) that leads to an unambiguous solution. If the near-end acoustic arrangement does not vary, this approach results in a good estimate of the transfer function h at all times, despite variation in the loudspeaker dependencies between the acoustic scenarios.

The multi-channel echo canceller 110 is configured to provide a good estimate of the transfer function $\hat{h}$ for the present acoustic scenario. To this purpose, the recursive notion of j-future-conditioned optimality for $\hat{h}$ is defined, and let $\hat{h}$ be optimal for block j. Then a solution $\hat{h}$ is j-future-conditioned optimal for block m<j if it optimal for block j given that it is j-future-conditioned optimal for all blocks n, such that n>m and n<j, and optimal for block j. The optimality criterion for $\hat{h}$ is i) present-block optimal (e.g., $\hat{h}$ should be the optimal solution for block j), and ii) past-block j-future-conditioned optimal (e.g., $\hat{h}$ is j-future-conditioned optimal for all blocks preceding block j).

To reach the two optimality objectives for $\hat{h}$, Eq. (15) is applied to the current block j. In general, $y_j$ does not need to lie in the column space of $X_j$ and, equivalently, $Q_j$ and hence the minimum of the criterion does not need to be zero. As the omission of the component that does not lie in the column space of $X_j$ does not affect the optimization, it can be omitted. To remove dimensions that do not affect the optimization, the criterion by $Q_j^H$ is multiplied (e.g., with respect to Eq. (17)). The problem is expressed in terms of a basis in the column space of $Q_j$ and the criterion (that of Eq. (18)) now minimizes to zero. Thus, the first objective (present-block optimality) implies that $\hat{h}_j$ is a solution of the equation:

$$Q_j^H y_j + B_j \hat{h}_j = 0, \qquad \text{Eq. (24):}$$

which has a general solution of the form of Eq. (20). With the multiplication by $Q_j^H$, the dimensionality of the problem is reduced from $\mathfrak{P}$ to $|\mathfrak{Q}|$.

To reduce memory requirements for storing acoustic scenarios and to facilitate further manipulation, $z_j = Q_j^H y_j$ is written as:

$$z_j + B_j \hat{h}_j = 0, \qquad \text{Eq. (25):}$$

where $z_j \in \mathbb{C}^{Q|\mathcal{A}_k|}$.

Eq. (25) can be interpreted as specifying a set of constraints on the solution $\hat{h}_j$, one for each row. If these constraints are satisfied, then $\hat{h}$ is optimal for block j. Note that both $z_j$ and $B_j$ have low dimensionality and require significantly less memory than storing $y_j$ and $X_j$.

Finding the impulse response is now equivalent to finding the solution of a sequence of constraint sets in Eq. (25), subject to projection on the appropriate subspace. For the current block j, Eq. (25) must hold. However, Eq. (25) specifies $\hat{h}_j$ only in the row space of $B_j$. The component of $\hat{h}_j$ that lies in the null-space of $B_j$, can be made to satisfy the constraints of scenario j−1, and so on.

Next, the following discussion provides a description in a more formal matter. Let us denote by the overbar $\overline{\cdot}$ the column space of its argument. The problem specifies that, for scenario n<j, $\hat{h}_j$ can be optimized within the space $C_n = \overline{1} \cup_{n+1}^j \overline{B_j^H}$ (which will be zero when n is sufficiently less than j). Note that $C_n$ can be computed as the null-space of the stacking of $B_n, \ldots, B_j$. Now, the solution can be written as follows:

$$\hat{h}_j = \Sigma_{n=n_0}^j C_n b_n, \qquad \text{Eq. (26):}$$

with $C_n b_n$ are solutions lying in the desired subspaces and $n_0$ is sufficiently less than n.

The solution for the sequence of problems is given in the Appendix (below). However, note that the indexing of the optimization problem in the Appendix is forward for clarity, whereas in the application it is backward in time. The multi-channel echo canceller 110 is configured to execute the following Algorithm 1. Algorithm 1 is an example of the cancellation solution algorithm 125 of FIG. 2.

The multi-channel echo canceller 110 is configured to receive scalar microphone signal y, and a multi-channel loudspeaker driving signal x. The multi-channel echo canceller 110 is configured to execute Algorithm 1 (e.g., the cancellation solution algorithm 125) to generate an echo-free microphone signal and the transfer function $\hat{h}_j$ for each subsequent scenario j.

---

Algorithm 1

Data: scalar microphone signal y, and a multi-channel loudspeaker driving signal x
Result: echo-free micophone signal
Result: the transfer function $\hat{h}_j$ for each subsequent scenario j
define time-frequency patches $\mathcal{A}_k$ for each frequency k, and
for each frequency k $\in \mathcal{K}$ do:
  %% Obtain channel k for time-frequency representation;
  compute sequence of patch vectors $\{\tilde{x}_{p,k}\}$;
  compute sequence of scalars $\{\tilde{y}_{p,k}\}$;
  identify scenario time intervals with scenario label j $\in$ J;
  %% for clarity drop identifiers p and k where clear below;
  for each scenario j $\in \mathcal{J}$ do
    %%Characterize scenario;
    stack $\mathfrak{P}_j$ scenario vectors $\tilde{x}_p$ into matrix $X_j$; %% step 402
    stack $\mathfrak{P}_j$ scenario scalars $\tilde{y}_p$ into vector $y_j$; %% step 404
    compute $Q_j$ and $B_j$ in QR decomposition $X_j = Q_j B_j$; %% step 406
    $z_j = Q_j^H y_j$ discard $X_j$ and $Q_j$ (typically of high dimensionality);
    %% steps 408 and 410
    %% Compute response;

Algorithm 1 (continued)

```
        b = B_j^H (B_j B_j^H)^-1 z_j; %% first part of step 412
        ĥ_j = b; %% second and last part of step 412
        C̄ = Ī\B_j^H; %% step 416
        l = j - 1; %% previous scenario; %% step 414
        while rank( C ) > rank(B_l^H) do %% step 426
            b = C^H B_l^H (B_l CC^H B_l^H)^-1(z_l - B_l ĥ_j); %% step 418
            ĥ_j = ĥ_j + Cb; %% step 420
            C̄ = C̄\B_l^H ; %% step 422
            l = l - 1; %% decrease previous scenario index; %% step 424
        end
        b = (C^H B_l^H B_l C)^-1 C_K^H B_l^H (z_l - B_l ĥ_j); %% part of step 428
        ĥ_j = ĥ_j + Cb ; %% also part of step 428
        echo-free microphone signal: y_j - X_j ĥ_j
        retain z_j and B_j (of low-dimensionality) for future use
    end
end
```

Section 3—Variants on the Basic Algorithm

An arrangement that is a version of the system defined in earlier sections is a time-domain system. In this case, the time-frequency patch $\mathcal{A}$ is the time segment corresponding to the impulse response. In some examples, one particular arrangement is where only two acoustic scenarios are used: the current scenario and the last acoustic scenario where $B_j$ was square and full rank. This variation may result in very low storage and computational requirements. However, the information used may be less up-to-date than of the variant described with reference to Algorithm 1. In this case, it may be appropriate to create artificially a full-rank scenario at the beginning of a session, by adding different low-amplitude noise signals to the loudspeaker signals. From then onward, the last acoustic scenario with full-rank will be retained in memory to determine the solution component lying in the null-space of B of subsequent scenarios.

Appendix

Section 4—Moore-Penrose Pseudo-Inverse for Under-Specification

In this section, the Moore-Penrose pseudo-inverse for the case of under specification is derived.

$$y = Ax, \quad \text{Eq. (27):}$$

where $x \in \mathbb{C}^N$, and $y \in \mathbb{C}^M$, with M<N. That is, A is a fat matrix. Thus, the equation is underspecified. The inverse of A that minimizes the L2 norm of x under the constraint that y=Ax is determined. Let us decomponse $x = x_0 + \tilde{x}$, where $\tilde{x}$ lies in the null-space of A. It is noted that $y = A(x_0 + \tilde{x})$ is true for any $\tilde{x}$ in the null space of A. The square of the L2 norm is written as:

$$\|x\|_2^2 = x_0^H x_0 + \tilde{x}^H \tilde{x} \quad \text{Eq. (28):}$$

and the null-space component $\tilde{x} = 0$, minimizes the L2 norm. Moreover, it can be seen that the solution for x is unique if $\tilde{x} = 0$. Then, the unique solution that lies in the column space of $A^H$ can be:

$$x = A^H z, \quad \text{Eq. (29):}$$

where $z \in \mathbb{C}^M$. The equation y=Ax can be written as $$y = AA^H z \quad \text{Eq. (30):}$$

$$z = (AA^H)^{-1} y, \quad \text{Eq. (31):}$$

and hence:

$$x = A^H (AA^H)^{-1} y, \text{ which concludes the derivation.} \quad \text{Eq. (32):}$$

Section 5—A Recursive Subspace Problem

In this Section, the recursive optimization problem is solved, $$\min_h \|z_n - B_n h\| \quad \text{subject to} \quad \text{Eq. (33)}$$

$$\left( \min_h \|z_{n-1} - B_{n-1} h\| \quad \text{subject to} \right.$$

$$\left( \ldots \right.$$

$$\left( \min_h \|z_1 - B_1 h\| \quad \text{subject to} \right.$$

$$\left. z_0 - B_0 h = 0 \right) \ldots \Big) \Big).$$

This problem formulation explicitly assigns priority to optimizations with a lower index value. Note that in this Section, the indexing forward in time, for simplicity, is run. Some notation is introduced first. Let A be a matrix, then $\overline{A}$ denotes the subspace spanned by its column vectors. The null-space of $A^H$ is then $\overline{I \backslash A}$, where I is the identity matrix. h is expanded into components that are constrained to lie in subspaces that are orthogonal to components found earlier in the recursion. The components are indexed with $k \in \{0, 1, \ldots, K\}$.

Let $C_n$ be a full-rank matrix with its columns constraining the subspace that a k'th solution component must lie in. Let $\overline{C_{k+1}}$ be the column space of $\overline{C_n}$ that does not intersect with the column space of $\overline{B_n}$. $\overline{C_{k+1}} = \overline{C_n} \backslash \overline{B_n}$ can be written with $\overline{C_0} = \overline{I}$. This implies $$\overline{C_n} = \overline{I} \backslash \cup_{l=0}^{n-1} \overline{B_l}. \quad \text{Eq. (34):}$$

In line with this, any matrix $C_n$ is defined with column space $\overline{C_n}$. The progressive shrinkage of the subspaces $\overline{C_n}$ facilitates a convenient expansion of h:

$$h = \sum_{l=0}^{n-1} C_l b_l, \quad \text{Eq. (35)}$$

which assumes that the columns spaces of $C_n$ spans the space that h is specified in and where K is sufficiently large.

From Eq. (35), $b_0$ is fully specified by the k=0 constraint in Eq. (33), giving $$b_0 = B_0^H (B_0 B_0^H)^{-1} z_0, \quad \text{Eq. (36):}$$

as $B_0 B_0^H$ is invertible.

The optimization problem for finding $b_n$ can now be formulated as an unconstrained problem:

$$\min_{b_n} \left\| z_n - B_n \left( C_n b_n + \sum_{l=0}^{n-1} C_l b_l \right) \right\|, \quad \text{Eq. (37)}$$

where $b_n$, $n \in \{0, \ldots, n-1\}$ are already known. This problem can be underdetermined, fully determined, or over-determined. If the problem in Eq. (37) is underdetermined, then $b_n$ satisfies $$b_n = (B_n C_n)^\# \left( z_n - B_n \sum_{l=0}^{n-1} C_l b_l \right) = \quad \text{Eq. (38)}$$

$$C_n^H B_n^H (B_n C_n C_n^H B_n^H)^{-1} \left( z_n - B_n \sum_{l=0}^{n-1} C_l b_l \right).$$

While this solution also holds for the fully determined case, the latter is lumped with the overdetermined case. For the overdetermined (or fully determined) case the expansion can be terminated (k=K) to obtain:

$$b_n = (B_n C_n)^\# \left( z_n - B_n \sum_{n=0}^{K-1} C_n b_n \right) = \quad \text{Eq. (39)}$$

$$(C_n^H B_n^H B_n C_n)^{-1} C_n^H B_n^H \left( z_n - B_n \sum_{l=0}^{n-1} C_l b_l \right).$$

The recursion is assumed to terminate. Then, if K is defined to be the smallest K where the rank of $C_n$ is less or equal to the rank of $B_n$ the solution is of the form in Eq. (35) with the $b_n$ given by Eq. (36), Eq. (38) and Eq. (39).

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method for multi-channel echo cancellation, the method comprising:
   receiving first acoustic signals during a first time interval relating to a present acoustic scenario, the first acoustic signals including a first microphone signal and a first multi-channel loudspeaker driving signal, the first multi-channel loudspeaker driving signal including a first driving signal that drives a first loudspeaker, and a second driving signal that drives a second loudspeaker, the first driving signal being the same as the second driving signal, the first microphone signal including a near-end signal with echo;
   obtaining a previous acoustic scenario from a memory device, the previous acoustic scenario including second acoustic signals from a second time interval, the second time interval occurring before the first time interval, the second acoustic signals including a second microphone signal and a second multi-channel loudspeaker driving signal;
   estimating a first acoustic transfer function and a second acoustic transfer function for the present acoustic scenario using the first and second acoustic signals; and
   removing the echo from the microphone signal based on the first acoustic transfer function and the second acoustic transfer function.

2. The method of claim 1, wherein the first transfer function defines transmission characteristics in a room between a microphone and the first loudspeaker, and the second transfer function defines transmission characteristics in the room between the microphone and the second loudspeaker.

3. The method of claim 1, further comprising:
   updating at least one coefficient of the first acoustic transfer function or at least one coefficient of the second acoustic transfer function in response to a change to the present acoustic scenario.

4. The method of claim 1, further comprising:
   determining that the first and second acoustic transfer functions cannot be estimated using the first and second acoustic signals; and
   obtaining another previous acoustic scenario from the memory device, the another previous acoustic scenario including third acoustic signals from a third time interval, the third time interval occurring before the second time interval,
   wherein the first and second acoustic transfers functions are estimated using the first through third acoustic signals.

5. The method of claim 1, wherein the removing the echo from the microphone signal comprises:
   generating an echo replica signal based on the first and second acoustic transfer functions, the first acoustic transfer function providing an expected contribution of the first driving signal in the microphone signal, the second acoustic transfer function providing an expected contribution of the second driving signal in the microphone signal; and
   subtracting the echo replica signal from the microphone signal.

6. The method of claim 1, wherein the first and second acoustic transfer functions are estimated without distortion being introduced into at least one of the first driving signal or the second driving signal.

7. The method of claim 1, wherein estimating the first and second acoustic transfer functions includes determining at least one first coefficient of the first acoustic transfer function and at least one second coefficient of the second acoustic transfer function for the present acoustic scenario using time-frequency transforms of the first and second acoustic signals.

8. A voice-activated speaker device comprising:
   a network interface configured to wirelessly connect to a network to receive audio data;
   a microphone configured to capture a voice-activated command;
   a first loudspeaker; and
   a multi-channel echo canceller configured to receive first acoustic signals during a first time interval relating to a present acoustic scenario, the first acoustic signals including a microphone signal and a multi-channel loudspeaker driving signal having the audio data, the multi-channel loudspeaker driving signal including a first driving signal that drives the first loudspeaker, and a second driving signal that drives a second loudspeaker, the first driving signal being the same as the second driving signal, the microphone signal including the voice-activated command with echo from the first and second loudspeakers,
   the multi-channel echo canceller configured to obtain a previous acoustic scenario from a memory device, the previous acoustic scenario including second acoustic signals from a second time interval, the second time interval occurring before the first time interval, the second acoustic signals including a second microphone signal and a second multi-channel loudspeaker driving signal, the multi-channel echo canceller configured to estimate a first acoustic transfer function and a second acoustic transfer function for the present acoustic scenario using the first and second acoustic signals, the multi-channel echo canceller configured to remove the echo from the microphone signal based on the first and second acoustic transfer functions.

9. The voice-activated speaker device of claim 8, wherein the first transfer function defines transmission characteristics in a room between the microphone and the first loudspeaker, and the second transfer function defines transmission characteristics in the room between the microphone and the second loudspeaker.

10. The voice-activated speaker device of claim 8, wherein the multi-channel echo canceller is configured to update at least one coefficient for the first acoustic transfer function or the second acoustic transfer function in response to a change to the present acoustic scenario.

11. The voice-activated speaker device of claim 8, wherein the multi-channel echo canceller is configured to:
determine that the first and second acoustic transfer functions cannot be estimated using the first and second acoustic signals;
obtain another previous acoustic scenario from the memory device, the another previous acoustic scenario including third acoustic signals from a third time interval, the third time interval occurring before the second time interval,
wherein the first and second acoustic transfers functions are estimated using the first through third acoustic signals.

12. The voice-activated speaker device of claim 8, wherein the multi-channel echo canceller is configured to generate an echo replica signal based on the first and second acoustic transfer functions and subtract the echo replica signal from the microphone signal.

13. The voice-activated speaker device of claim 8, wherein the first and second acoustic transfer functions are estimated without distortion being introduced into at least one of the first driving signal or the second driving signal.

14. A non-transitory computer-readable medium storing executable instructions that when executed by at least one processor cause the at least one processor to execute operations, the operations comprising:
receive first acoustic signals during a first time interval relating to a present acoustic scenario, the first acoustic signals including a microphone signal and a multi-channel loudspeaker driving signal, the multi-channel loudspeaker driving signal including a first driving signal that drives a first loudspeaker, and a second driving signal that drives a second loudspeaker, the first driving signal being the same as second driving signal, the microphone signal including a near-end signal with echo;
obtain a previous acoustic scenario from a memory device, the previous acoustic scenario including second acoustic signals from a second time interval, the second time interval occurring before the first time interval, the second acoustic signals including a second microphone signal and a second multi-channel loudspeaker driving signal;
estimate a first acoustic transfer function and a second acoustic transfer function for the present acoustic scenario using the first and second acoustic signals; and
remove the echo from the microphone signal based on the first acoustic transfer function and the second acoustic transfer function.

15. The non-transitory computer-readable medium of claim 14, wherein the first transfer function defines transmission characteristics in a room between a microphone and the first loudspeaker, and the second transfer function defines transmission characteristics in the room between the microphone and the second loudspeaker.

16. The non-transitory computer-readable medium of claim 14, the operations further comprising:
update at least one coefficient of the first acoustic transfer function or at least one coefficient of the second acoustic transfer function in response to a change to the present acoustic scenario.

17. The non-transitory computer-readable medium of claim 14, wherein the first and second acoustic transfer functions are estimated without distortion being introduced into at least one of the first driving signal or the second driving signal.

* * * * *